United States Patent
Wang et al.

(10) Patent No.: US 7,979,393 B2
(45) Date of Patent: Jul. 12, 2011

(54) MULTIPHASE TOPOLOGY-WIDE CODE MODIFICATIONS FOR PEER-TO-PEER SYSTEMS

(75) Inventors: Rui Wang, Redmond, WA (US); Qun Guo, Redmond, WA (US); Dennis Michael Tighe, Seattle, WA (US); Gopal Ashok, Bellevue, WA (US); Peng Song, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 453 days.

(21) Appl. No.: 12/036,002

(22) Filed: Feb. 22, 2008

(65) Prior Publication Data
US 2009/0216777 A1    Aug. 27, 2009

(51) Int. Cl.
*G06F 17/30* (2006.01)
(52) U.S. Cl. .................... 707/622; 707/803; 709/238
(58) Field of Classification Search ............. 707/620, 707/622, 803, 999.1, 999.01, 999.101, 999.107; 709/238
See application file for complete search history.

(56) References Cited

U.S. PATENT DOCUMENTS

| | | | |
|---|---|---|---|
| 5,737,601 A | 4/1998 | Jain et al. | |
| 6,122,630 A | 9/2000 | Strickler et al. | |
| 6,615,223 B1 | 9/2003 | Shih et al. | |
| 6,631,519 B1* | 10/2003 | Nicholson et al. | 717/169 |
| 7,136,868 B2* | 11/2006 | Sonkin et al. | 707/754 |
| 7,137,099 B2* | 11/2006 | Knight et al. | 717/100 |
| 7,143,123 B2 | 11/2006 | Tom et al. | |
| 7,149,759 B2 | 12/2006 | Morrison | |
| 7,162,689 B2* | 1/2007 | Demers et al. | 715/227 |
| 7,240,054 B2 | 7/2007 | Adiba et al. | |
| 7,281,018 B1* | 10/2007 | Begun et al. | 1/1 |
| 7,318,075 B2* | 1/2008 | Ashwin et al. | 1/1 |
| 2004/0003003 A1* | 1/2004 | McCartney et al. | 707/200 |
| 2004/0162859 A1 | 8/2004 | Guo et al. | |
| 2004/0205048 A1* | 10/2004 | Pizzo et al. | 707/3 |
| 2005/0044187 A1* | 2/2005 | Jhaveri et al. | 709/219 |
| 2005/0289186 A1* | 12/2005 | Guo et al. | 707/200 |
| 2006/0101452 A1 | 5/2006 | Mak | |
| 2006/0167925 A1* | 7/2006 | Smith et al. | 707/102 |
| 2006/0195459 A1* | 8/2006 | Nori et al. | 707/100 |
| 2007/0022142 A1* | 1/2007 | Palmer et al. | 707/200 |
| 2007/0061266 A1* | 3/2007 | Moore et al. | 705/51 |
| 2007/0244904 A1* | 10/2007 | Durski | 707/10 |
| 2008/0294673 A1* | 11/2008 | Rupp et al. | 707/102 |
| 2009/0063555 A1* | 3/2009 | Fisher et al. | 707/103 R |
| 2009/0228253 A1* | 9/2009 | Tolone et al. | 703/6 |

OTHER PUBLICATIONS

Configuring SQL Server 2005 Peer-to-Peer Replication. http://sqlblogcasts.com/blogs/rayb/attachment/2521.ashx. Last accessed Feb. 6, 2008, pp. 12.
Adding Columns to Replicate (Bidirectional or Peer-to-Peer Replication) http://publib.boulder.ibm.com/infocenter/db2luw/v9/index.jsp?topic=/com.ibm.websphere.ii.replication.qrepl.doc/administering/iiyrqsubtchgadc1.html. Last accessed Feb. 6, 2008, pp. 2. Can Turker, et al. How Can We Support Grid Transactions? Towards Peer-to-Peer Transaction Processing. Proceedings of the 2005 CIDR Conference. http://66.102.9.104/search?q=cache:OieEua30kG0J:www-db.cs.wisc.edu/cidr/cidr2005/papers/P15.pdf. Last accessed Feb. 6, 2008, pp. 12.

* cited by examiner

*Primary Examiner* — Leslie Wong
(74) *Attorney, Agent, or Firm* — Workman Nydegger

(57) ABSTRACT

Systems and methods that supply changes on-the-fly and without breaking execution of codes for schema changes in a peer-to-peer environment. The modification component supplies changes to peers or nodes in a topology by initially identifying dependencies (e.g., multiple level) that can be affected by the schema change, followed by performing the schema change to the codes or stored procedures. Accordingly, dependencies in an entire system can be refreshed, wherein multiple levels of dependencies can exist.

18 Claims, 12 Drawing Sheets

MULTIPHASE TOPOLOGY-WIDE CODE MODIFICATIONS FOR PEER-TO-PEER SYSTEMS

BACKGROUND

Advances in computer technology (e.g., microprocessor speed, memory capacity, data transfer bandwidth, software functionality, and the like) have generally contributed to increased computer application in various industries. Ever more powerful server systems, which are often configured as an array of servers, are commonly provided to service requests originating from external sources such as the World Wide Web, for example.

As the amount of available electronic data grows, it becomes more important to store such data in a manageable manner that facilitates user friendly and quick data searches and retrieval. Today, a common approach is to store electronic data in one or more databases. In general, a typical database can be referred to as an organized collection of information with data structured such that a computer program can quickly search and select desired pieces of data, for example. Commonly, data within a database is organized via one or more tables. Such tables are arranged as an array of rows and columns.

Also, the tables can comprise a set of records, wherein a record includes a set of fields. Records are commonly indexed as rows within a table and the record fields are typically indexed as columns, such that a row/column pair of indices can reference particular datum within a table. For example, a row can store a complete data record relating to a sales transaction, a person, or a project. Likewise, columns of the table can define discrete portions of the rows that have the same general data format, wherein the columns can define fields of the records.

Database applications allow the user to compare, sort, order, merge, separate and interconnect the data, so that useful information can be generated from the data. Capacity and versatility of databases have grown incredibly to allow virtually endless storage capacity utilizing databases. Such database systems can become complex to manage, wherein substantial investment of time of a skilled administrator is typically required.

For example, in a peer-to-peer replication topology based on transactional replication in the publisher-subscriber model, it becomes challenging to provide a low-impact methodology to make topology-wide configurations, including conflict detection configurations such as enabling and disabling, and schema operations such as column adding and column dropping.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation provides for database schema changes (e.g., dropping columns from definition tables) without breaking execution of codes or stored procedures that are associated with such schema changes, via a modification component in a distributed environment. Such a modification component can supply changes to peers or nodes in a topology by initially identifying dependencies (e.g., multiple level), which can be affected by the schema change, followed by performing the schema change to the codes or stored procedures. Accordingly, dependencies in entire system can be refreshed, wherein multiple levels of dependencies can exist. For example, stored procedures are modified not to depend on dropped columns and the columns are then dropped from a table definition. Hence, the subject innovation facilitates topology wide configurations including conflict detection configurations such as enabling/disabling and schema operations (e.g., column adding/dropping, conflict detection and the like.)

According to an exemplary methodology of the subject innovation, initially a column that is to be dropped can be designated. Subsequently, by verifying associated dependencies, stored procedures that refer to and/or depend on columns that are to be dropped are identified. A refreshing act can then be performed on such stored procedures, so that they no longer refer to columns that are to be dropped.

Such dependencies can be propagated throughout the topology, wherein every peer is notified of such dependency change and not referred to a column that has been dropped. As such and from a user's perspective, columns can be dropped from a table without manual intervention or without shutting down the system.

In a related aspect, when a user drops a table or a column, such request can be detected and the code generated therefrom is identified. Such code can then be propagated throughout the system to refresh dependencies, so that the code now remains independent of the changes. The codes can also be written to each peer's transactional language. Subsequently, such codes are carried in the proper order and applied to other peers in the system. Hence, changes can be made to the system on-the-fly, to mitigate a requirement of halting activities or execution of the code (e.g., without affecting execution of stored procedures) or shutting the system.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
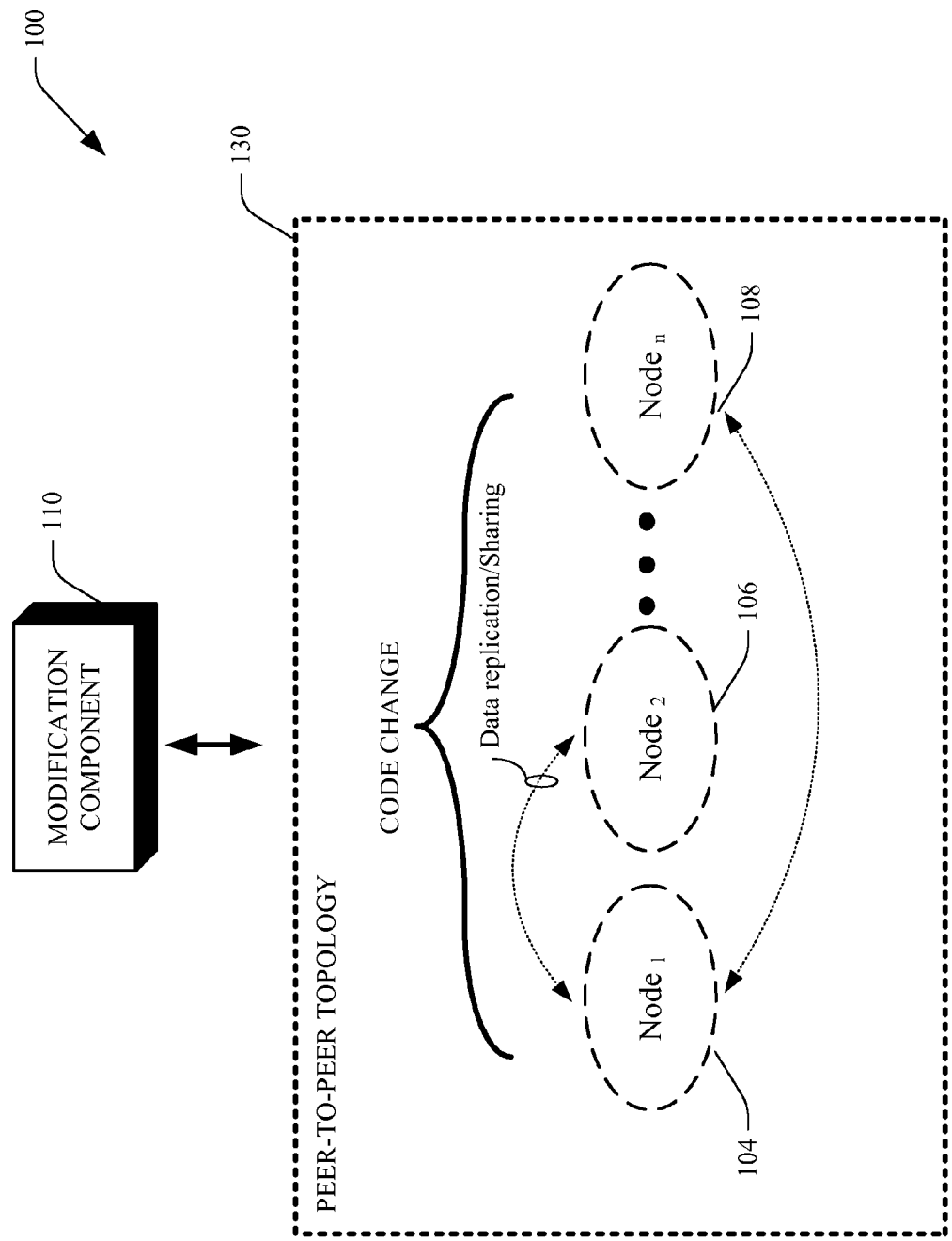
FIG. 1 illustrates a block diagram of a modification component that interacts in a peer-to-peer system in accordance with an aspect of the subject innovation.

FIG. 1 illustrates a block diagram of a system 100 that provides for database schema change (e.g., dropping columns from definition tables) without breaking execution of codes or stored procedures that are associated with such schema change, via modification component in a distributed environment. In general, the peer to peer network 100 is a network of nodes 104, 106, 108 (1 to n, n being an integer) (e.g., databases) that employ a same program or type of program to communicate and share data therebetween. For example, each computer or peer (e.g., node) 104, 106, 108 can be considered equal in terms of responsibilities and acts as a server to others in a network. In such topology, it can be assumed that one peer at a time is issuing a topology-wide configuration.

In one aspect, in one particular implementation of a peer to peer network, a list of nodes and data stored on the nodes 104, 106, 108 can be maintained, to facilitate nodes joining or disjoining the network at will. Upon joining, the nodes 104, 106, 108 provide a list of files they are capable of serving, wherein such list of files can be added to a list of the available files for all nodes. Upon disjoining by any node, the list of files are removed from the list of available files for all the nodes. Moreover, a requesting node (e.g., user) can request a file by sending a request. For example, the requesting node can further obtain the file via a direct connection to one of the nodes able to satisfy the request. As illustrated in FIG. 1, the modification component 110 can supply changes to peers or nodes in the topology 130 by initially identifying dependencies (e.g., multiple level) that can be affected by the schema change, followed by performing the schema change to the codes or stored procedures.

Figure 2:
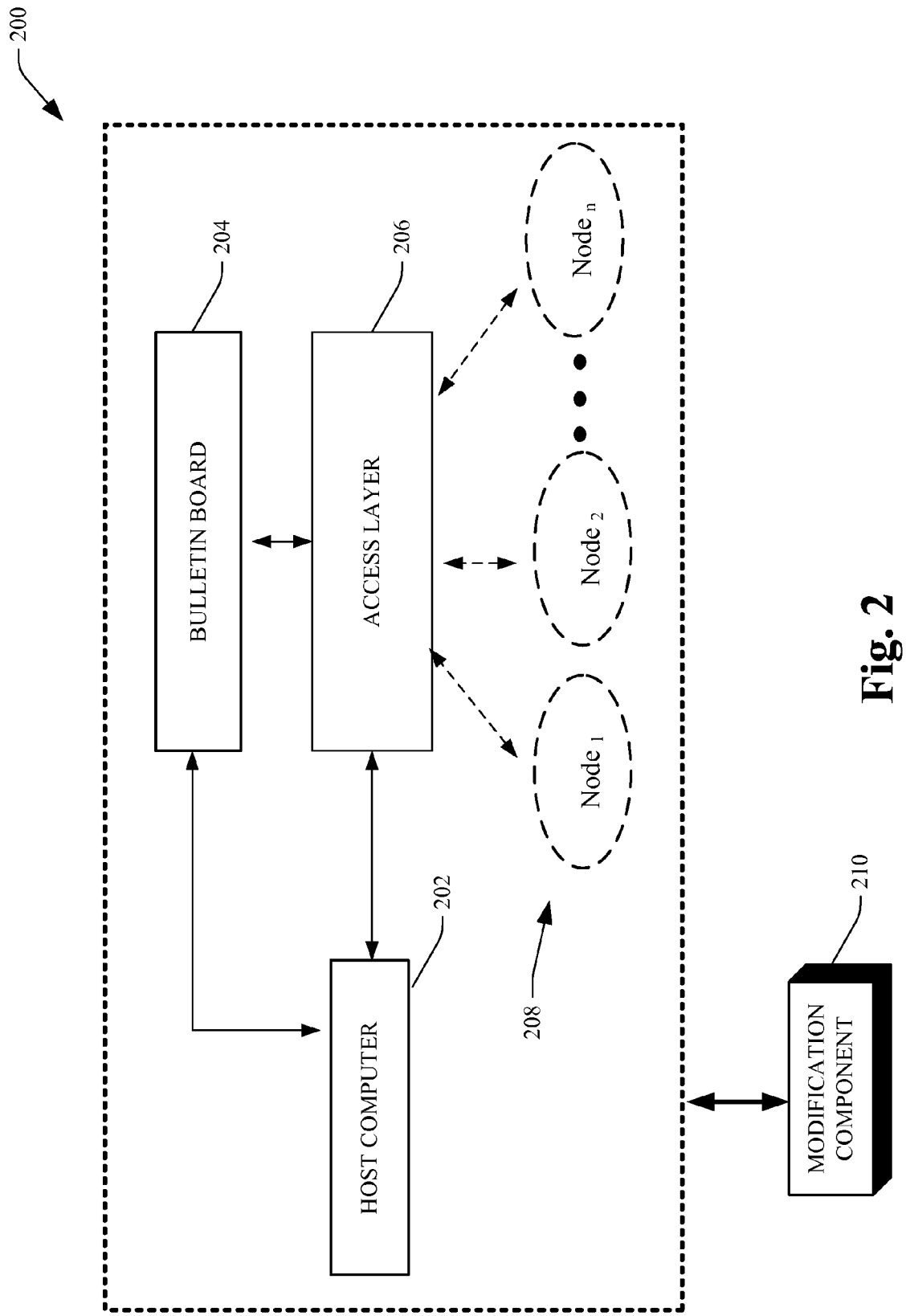
FIG. 2 illustrates a block diagram of database schema change with stored procedures in accordance with an aspect of the subject innovation.

FIG. 2 illustrates a further exemplary aspect of the subject innovation, wherein the data distribution system 200 includes a host computer 202, a bulletin board 204, an access layer 206 and a plurality of nodes 208. The modification component 210 facilitates topology wide configurations including conflict detection configurations such as enabling/disabling and schema operations such as column adding/dropping, conflict detection and the like. The data distribution system 200 is a peer to peer network and thus, permits data content to be requested and transferred to and from the plurality of nodes 208. The system 200 typically does not centrally maintain a list of available files and nodes storing those files, and instead employs the bulletin board 204 to maintain a list of requests or requested files. Furthermore, the system 200 is not required to track when the nodes enter and leave (e.g., join and un-join) the system 200. Additionally, the system 200 employs the access layer 206 to track and enforce fairness such that the nodes 208 properly contribute to the system 200 (e.g., sending files) in order to benefit from the system (e.g., receiving files).

The plurality of nodes 208 are operative to make requests for data, fill or serve requests for data and register periodically at a check in frequency. The plurality of nodes 208 are typically software components operating or executing on a computer system or server system. The nodes 208 are able to communicate and transfer data with each other, the bulletin board 204 and the access layer 206, generally via a network connection (e.g., Internet, wireless network, local area network, wide area network and the like) employing established protocols.

The host computer 202 controls and operates the bulletin board 204 and the access layer 206. The host computer 202 can be accessed by a user or operator in order to modify control and operation of the bulletin board 204 and the access layer 206. The user or operator can access the host computer by an input device (e.g., keyboard) of the host computer or remotely via a network connection.

The bulletin board 204 can maintain a list of requests that are in a predefined machine readable format. The requests in the list respectively include requested data (e.g., a file, an item or portion of a file) and a pointer to a requesting node (e.g., the node requesting the data). The pointer can simply be a network address, such as an IP address and port number, of the requesting node or other indicator such that the requesting node is identifiable and contactable by other nodes of the plurality of nodes 208. Additionally, the requests can include other information, such as, priority, desired time out period, download bandwidth and the like. Thus, the bulletin board 204 can remove un-filled requests after a time out period (e.g., after an age of the request exceeds the time out period). The time out period is typically selected to remove un-filled requests that have a low likelihood of being filled or served.

The access layer 206 is a mechanism for the host computer 202 to regulate access to and/or ability of the nodes 208 to make additional requests based on behavior or performance (e.g., served data). The access layer 206 tracks performance or behavior of the nodes 208 by tracking requests made, requests filled, checking in and the like of the nodes 208. The access layer 206 can prevent nodes from making requests for data if the nodes fail to meet a performance or behavior threshold. One approach for the access layer 206 to track performance is to compute a performance ratio of requests satisfied versus requests made over time.

As explained earlier, the modification component 210 can supply changes to peers or nodes in such a topology by initially identifying dependencies (e.g., multiple level), followed by performing the schema change to the codes or stored procedures. Accordingly, dependencies in entire system can be refreshed, wherein multiple levels of the dependencies can exist. For example, stored procedures, as described in detail infra, are modified not to depend on dropped columns and the columns are then dropped from a table definition. Hence, the subject innovation facilitates topology wide configurations including conflict detection configurations such as enabling/disabling and schema operations such as column adding/dropping, conflict detection and the like.

Figure 3:
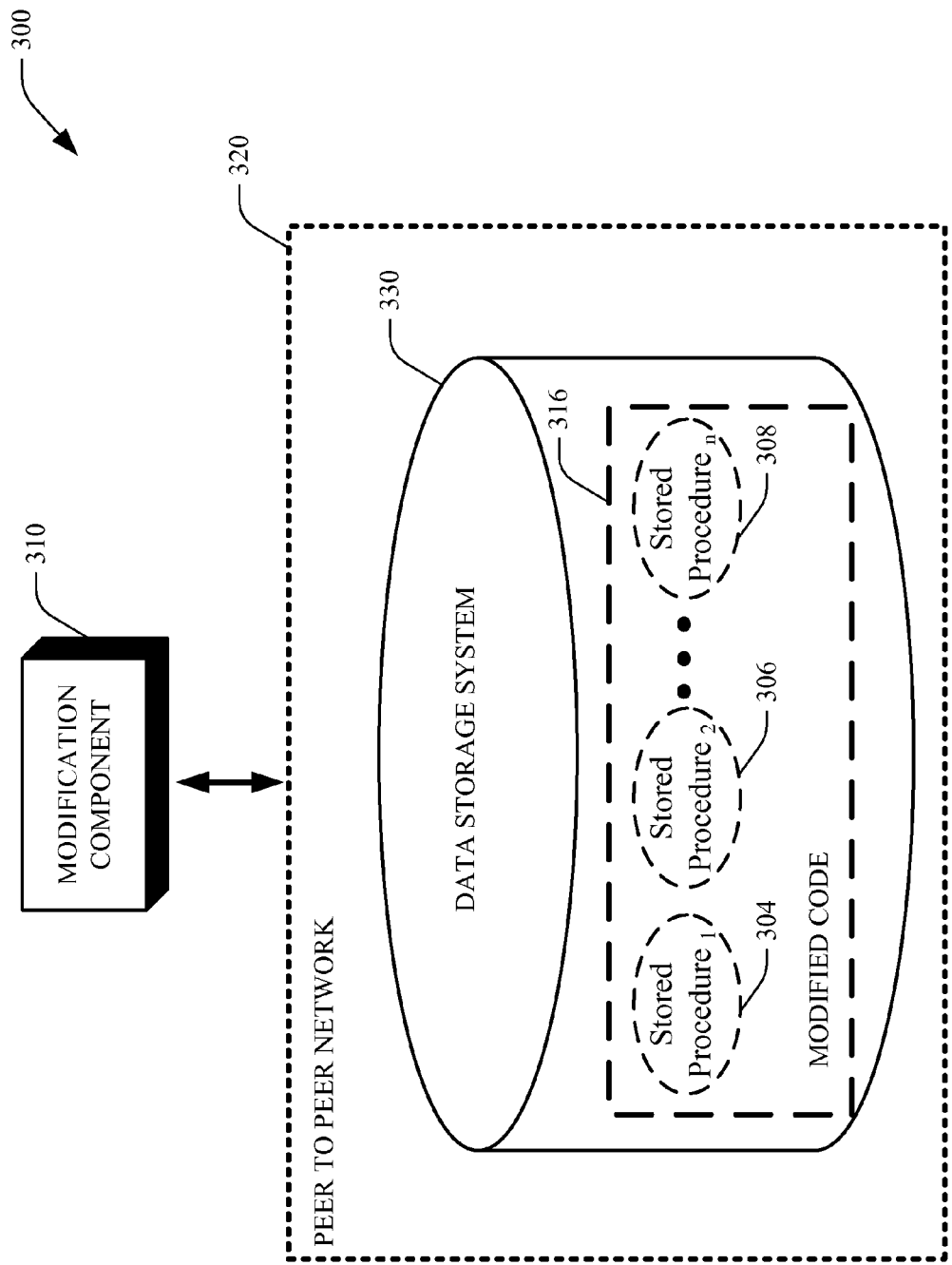
FIG. 3 illustrates a peer to peer topology that implements a modification component in accordance with an exemplary aspect of the subject innovation.

FIG. 3 illustrates a further exemplary aspect of the subject innovation wherein a peer(s) or node(s) is in the form of a database with codes that are to be modified. Such codes 316 can further include a plurality of stored procedures, wherein such stored procedures 304, 306, 308 (1 through n, where n is an integer) are programs (or procedures) that are physically stored within the database associated with the data storage system 330. Such programs are typically written in a proprietary database language and in response to a user request, run directly by an engine of the database associated with the data storage system 330.

The stored procedures 304, 306, 308 can have direct access to the data that requires manipulation, and typically need only to send results back to the user, thus mitigating the overhead of communicating large amounts of data back and forth. For example, typical uses for stored procedures 304, 306, 308 can include data validation, which is integrated into the database structure (stored procedures used for this purpose are often called triggers), or encapsulating some large or complex processing (such as manipulating a large data set to produce a summarized result). Stored procedures 304, 306, 308 can also be employed when the database associated with the data storage system 330 is manipulated from many external programs.

When a user drops a table or a column, such a request can be detected by the modification component 310 and a code generated therefrom. Such code can then be propagated throughout the system to refresh dependencies, so that the code now remains independent of the changes. The codes can also be written to each peer transactional language. Subsequently, such codes are carried in the proper order and applied to other peers in the system. Hence, changes can be made to the system on-the-fly and such mitigates a requirement of halting activities or execution of the code (e.g., without affecting execution of stored procedures) or shutting the system, which can be cumbersome Furthermore, the data storage system 330 can be a complex model based database structure, wherein an item, a sub-item, a property, and a relationship are defined to allow representation of information within a data storage system as instances of complex types. For example, the data storage system 330 can employ a set of basic building blocks for creating and managing rich, persisted objects and links between objects. An item can be defined as the smallest unit of consistency within the data storage system 330, which can be independently secured, serialized, synchronized, copied, backup/restored, and the like. Such an item can include an instance of a type, wherein all items in the data storage system 330 can be stored in a single global extent of items. Furthermore, the data storage system 330 can be based upon at least one item and/or a container structure, and can act as a storage platform exposing rich metadata that is buried in files as items. The data storage system 330 can include an associated database (not shown), to support the above discussed functionality, wherein any suitable characteristics and/or attributes can be implemented. Furthermore, the data storage system 330 can employ a container hierarchical structure, wherein a container is an item that can contain at least one other item. Such a containment concept can be implemented via a container ID property inside the associated class, wherein the store can also be a container in the form of a physical organizational and manageability unit. In addition, the store represents a root container for a tree of containers within the hierarchical structure. As such, and from a user's perspective, columns can be dropped from a table without manual intervention or without shutting down the system.

Figure 4:
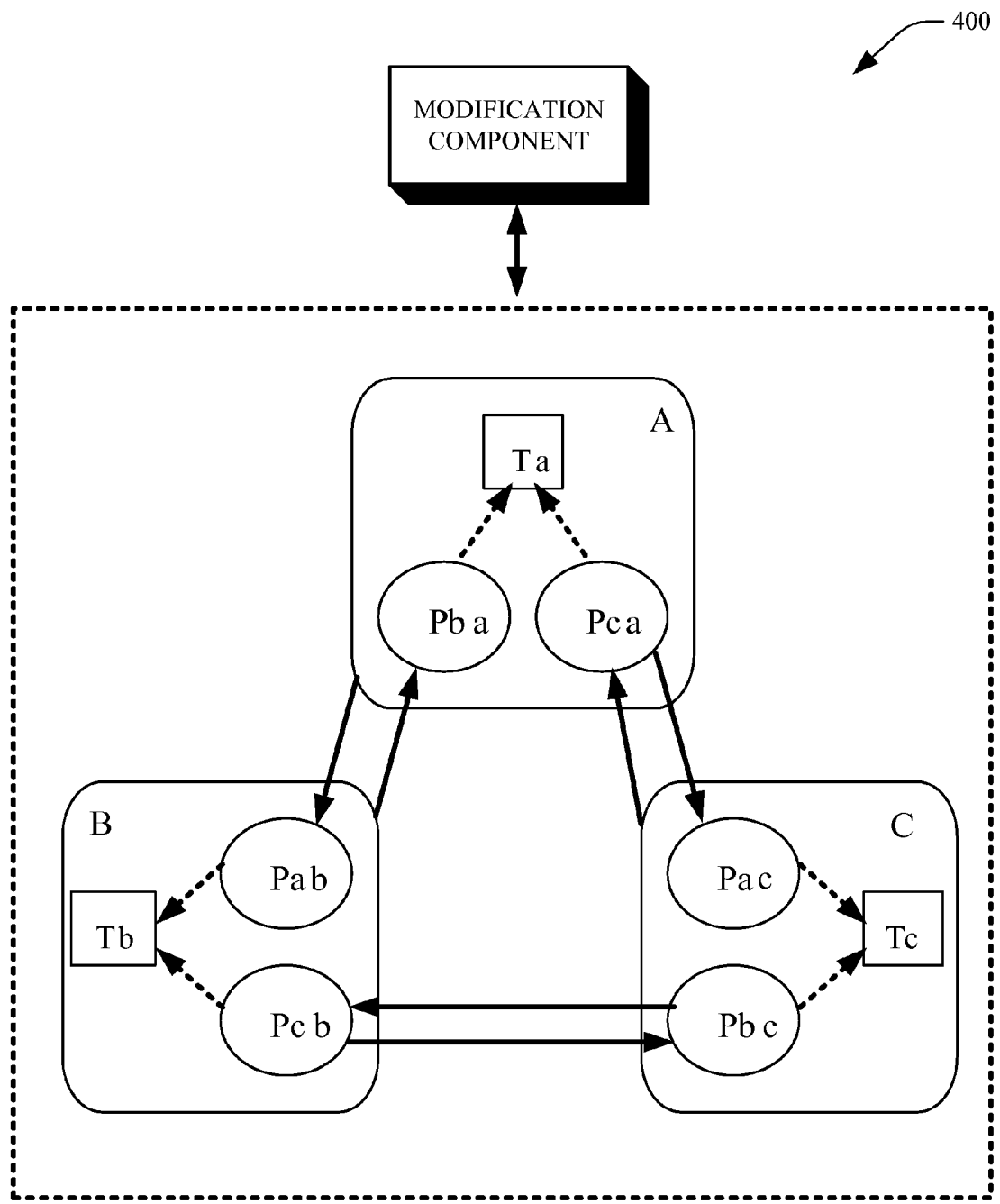
FIG. 4 illustrates dependencies that can be changed when implementing a modification in accordance with an aspect of the subject innovation.

FIGS. 4-7 illustrate a particular aspect of the subject innovation that modifies codes in a database via a modification component. FIG. 4 illustrates a system 400 with databases (e.g., peers) A, B, C, and each database includes tables associated therewith, wherein the peers share a same schema. Accordingly, API procedures can write API procedures to Ta and indicate associated dependencies. Changes to the data and the schema can propagate through database A, database B, and database C. Such illustrates a topology, with three peers: A, B and C, which have tables Ta, Tb and Tc, respectively, with the same schema. The proc Pxy (x, y=a, b or c, x <>y) is called by peer X (A, B or C) to replicate data from X to a destination peer Y (A, B or C). The definition of Pxy depends on the schema Ty. Thus the schema change to Ty may need to change Pxy first, otherwise, the execution of Pxy may break. For example, when a column is dropped from Ty, then Pxy is required to be changed beforehand. On the other hand, when a column is added into Ty, Pxy can remain unchanged without breaking its execution, assuming the column to be added allows null values.

Moreover, conflict detection configuration can incur schema changes. In addition, enabling conflict detection results in a hidden column being added to Ty, and Pxy can remain unchanged without breaking its execution—(however, Pxy is required to be changed in order to make conflict detection effective). Disabling conflict detection results in the hidden column being dropped from Ty, and Pxy should typically be changed beforehand in order not to break execution of Pxy, because the existing definition of Pxy depends on the existence of the hidden column. The modification component enables dropping a column from the table for all peers without breaking any execution of stored procedures, and without quiescing.

Figure 5:
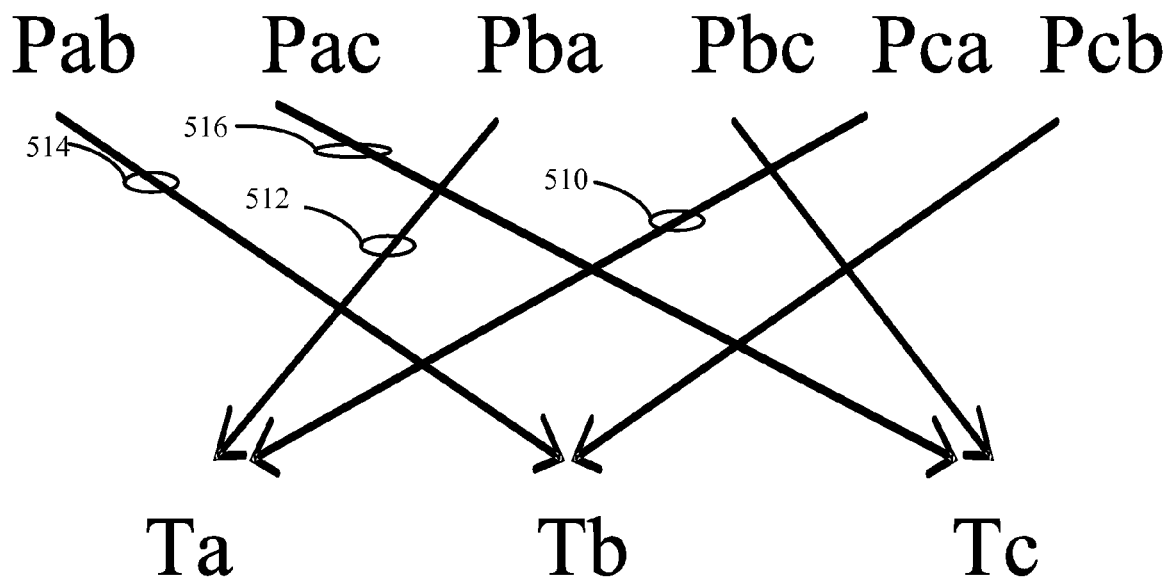
FIG. 5 illustrates additional exemplary dependencies according to a further aspect of the subject innovation.

FIG. 5 illustrates dependencies between stored procedures and the tables. As illustrated in FIG. 5, two arrows 510, 512 directed to Ta indicate that stored procedures Pba and Pca depend on Ta. Before a column is dropped from Ta, Pba and Pca must typically be changed to remove the dependency on the column to be dropped. If not, concurrent execution of Pba and Pca will break. Such is illustrated as dependency lines 510, 512 from Pba and Pca to Ta, and similarly 514, 516 for others.

Figure 6:
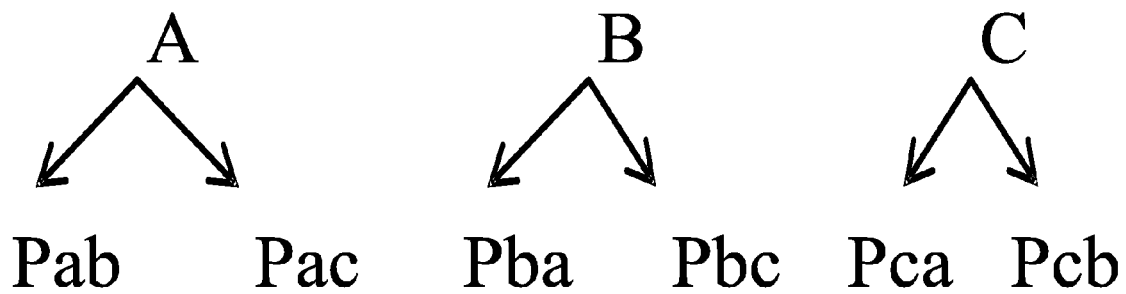
FIG. 6 illustrates a modification of dropping a column for all peers according to a further aspect of the subject innovation.
Figure 7:
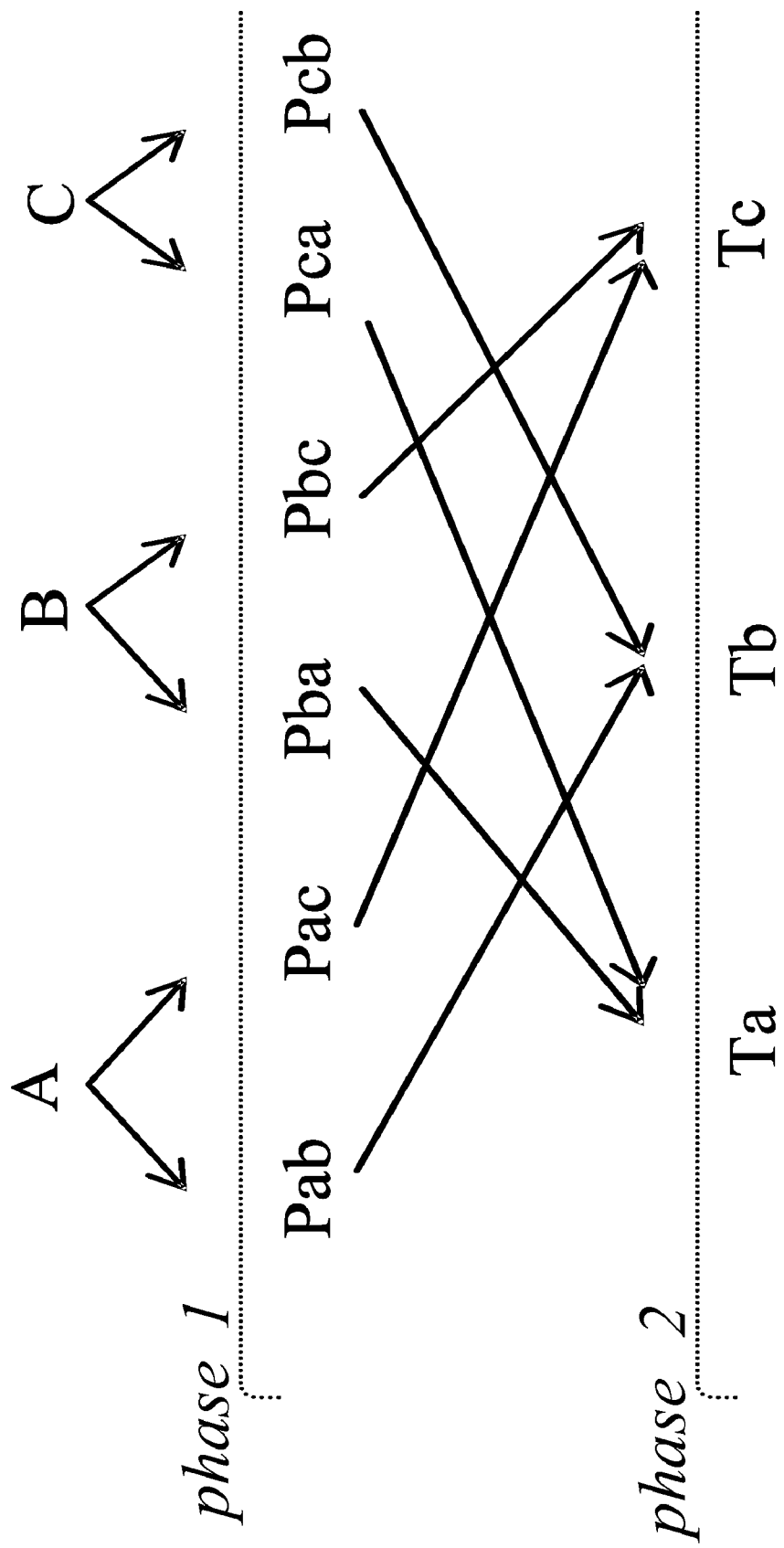
FIG. 7 illustrates phases of a schema change without breaking execution of codes in accordance with an aspect of the subject innovation.

As illustrated in FIG. 6, when an attempt is made to change Pba, there exists a possibility that peer B is also calling Pba to replicate data from B to A concurrently. Accordingly, B is instructed to change Pba, because B knows when it is not calling Pba. FIG. 6 illustrates such dependency as a line from B to Pba, and similarly for others. Likewise, FIG. 7 illustrates a comprehensive dependency graph for FIG. 5 and FIG. 6, which forms the basis for dropping a column for all peers without quiescing.

Accordingly, the modification component of the subject innovation can implement a two phase topology-wide operation, for example. During the first phase,. any peer in the topology can broadcast a request to require all peers to send a command to their subscribers to change stored procedures employed thereby. Put differently, A is requested to send a command to B to change stored procedure Pab, and a command to C to change stored procedure Pac, and A does not acknowledge to the request initiator until all its subscriber's stored procedures Pab and Pac are changed. During the second phase, any peer in topology broadcasts a request to require all peers to drop the column. Put differently, A is requested to drop the column for table Ta. Moreover, in phase 1, "send a command" is implemented by putting the command into the log. Thus, the command is replicated and there are no concurrent calls to the stored procedures to be changed from the "sender". Phase 2 is not started until phase 1 has finished successfully. It is to be appreciated, that the failures could occur during phase 1 and phase 2. The operations at each phase are made idempotent, so that when a phase is partially-finished due to failures of some peers, such phase can typically be re-started until this phase is finished completely and successfully. If the column to be dropped does not allow null values by definition, another phase can be inserted before phase 1, to have all peers change this column to allow null values.

Figure 8:
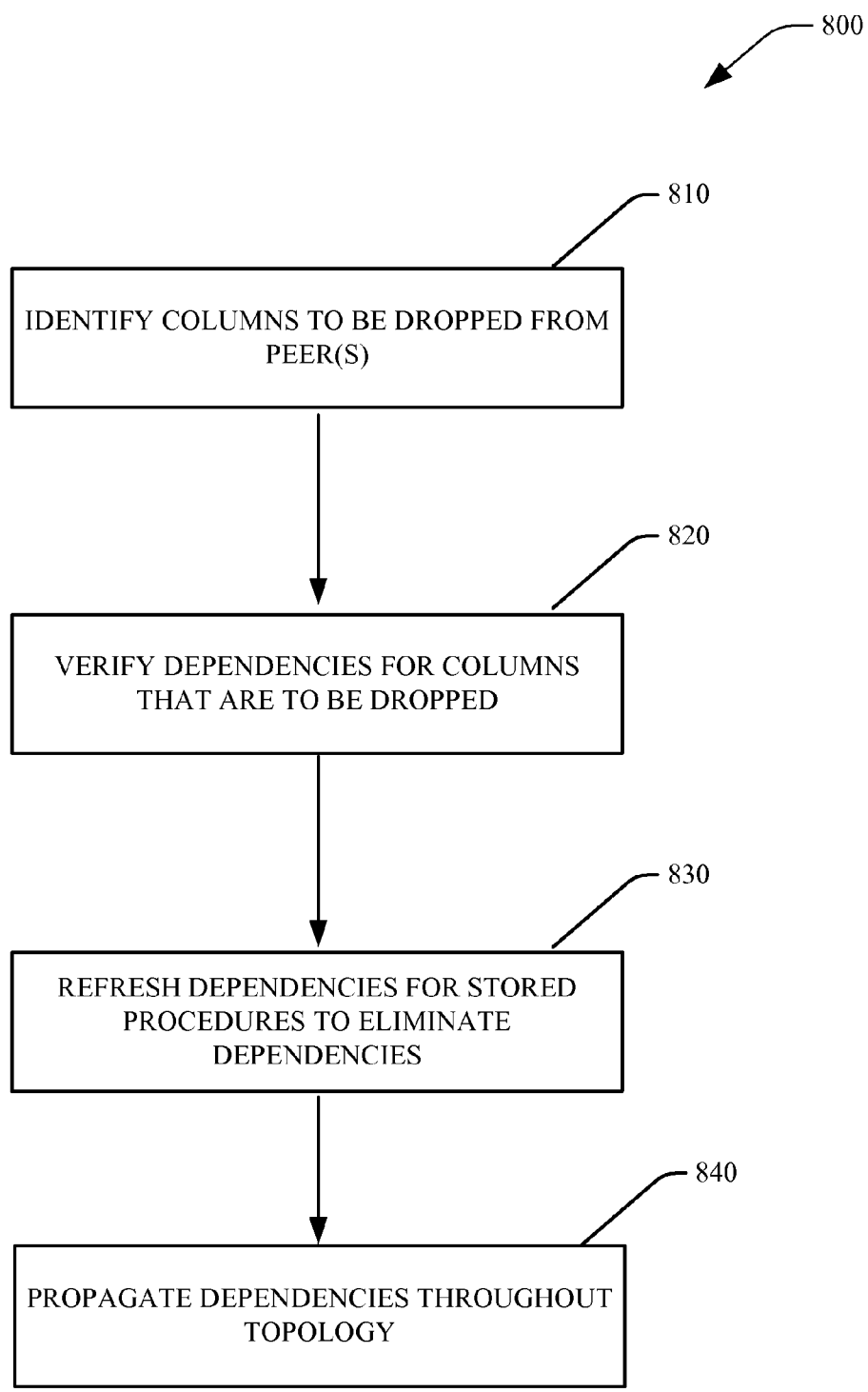
FIG. 8 illustrates a methodology of modifying a code according to an aspect of the subject innovation.

FIG. 8 illustrates a related methodology 800 of modifying a code and dropping columns according to an aspect of the subject innovation. Initially at 810, a column that is to be dropped can be identified from a peer and/or data. Subsequently at 820, associated dependencies for stored procedures that refer to and/or depend on columns that are to be dropped, are verified. At 830, a refreshing act can then be performed on such stored procedures, so that they no longer refer to columns that are to be dropped. Such dependencies can be propagated at 840 throughout the topology, wherein every peer is notified of such dependency change and not refer to a column that has been dropped. As such and from a user's perspective, columns can be dropped from a table without manual intervention or without shutting down the system.

Figure 9:
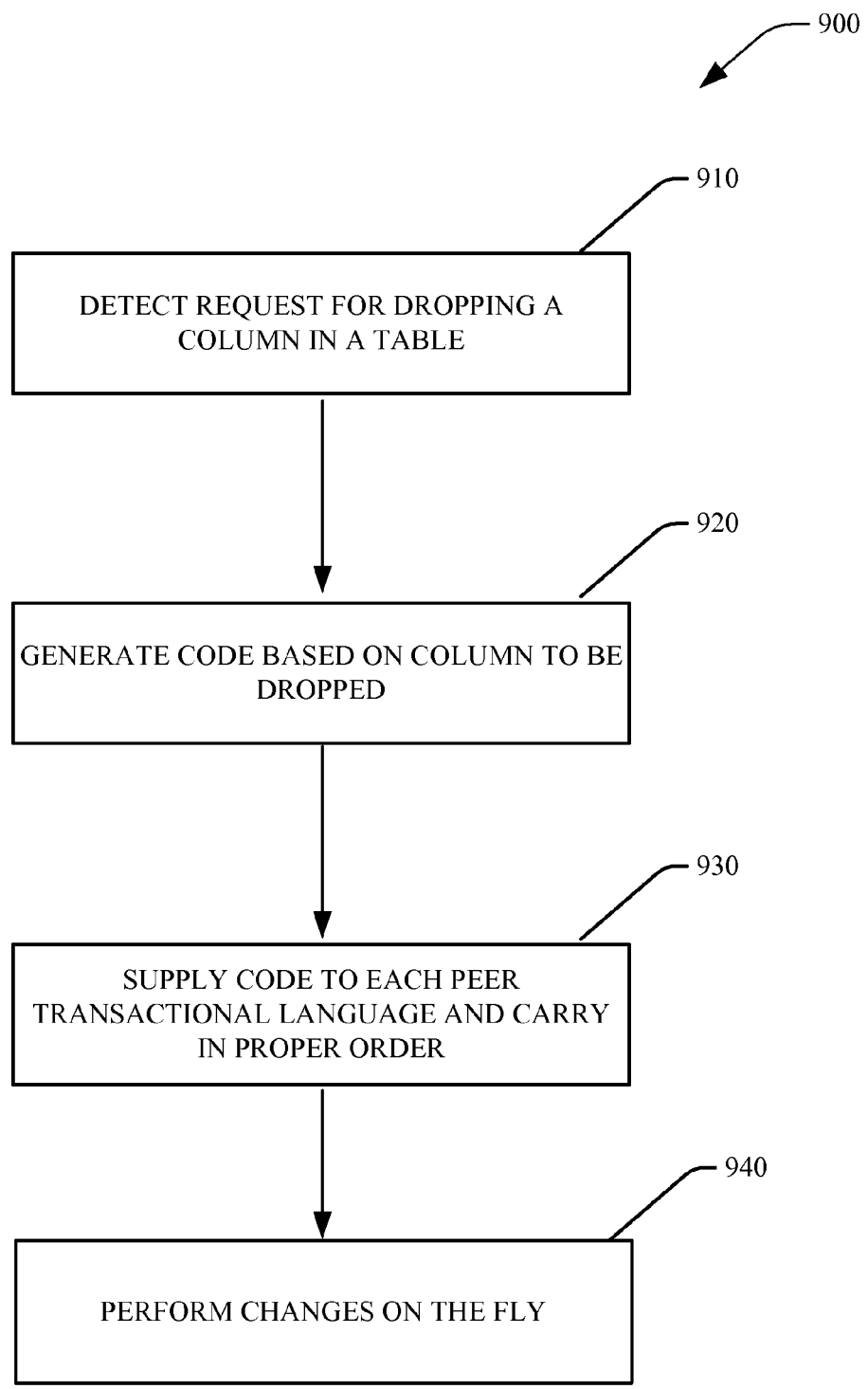
FIG. 9 illustrates a further methodology of dropping a column according to a further aspect of the subject innovation.

FIG. 9 illustrates a related methodology 900, when a user drops a table or a column, such request can be detected at 910 and a code generated therefrom at 920. Such code can then be propagated throughout the system to refresh dependencies, so that the code now remains independent of the changes. The codes can also be written to each peer transactional language at 930. Subsequently, such codes are carried in the proper order and applied to other peers in the system. Hence, changes can be made to the system on-the-fly at 940 and such mitigates a requirement of halting activities or execution of the code (e.g., without affecting execution of stored procedures) or shutting the system, which can be cumbersome.

Figure 10:
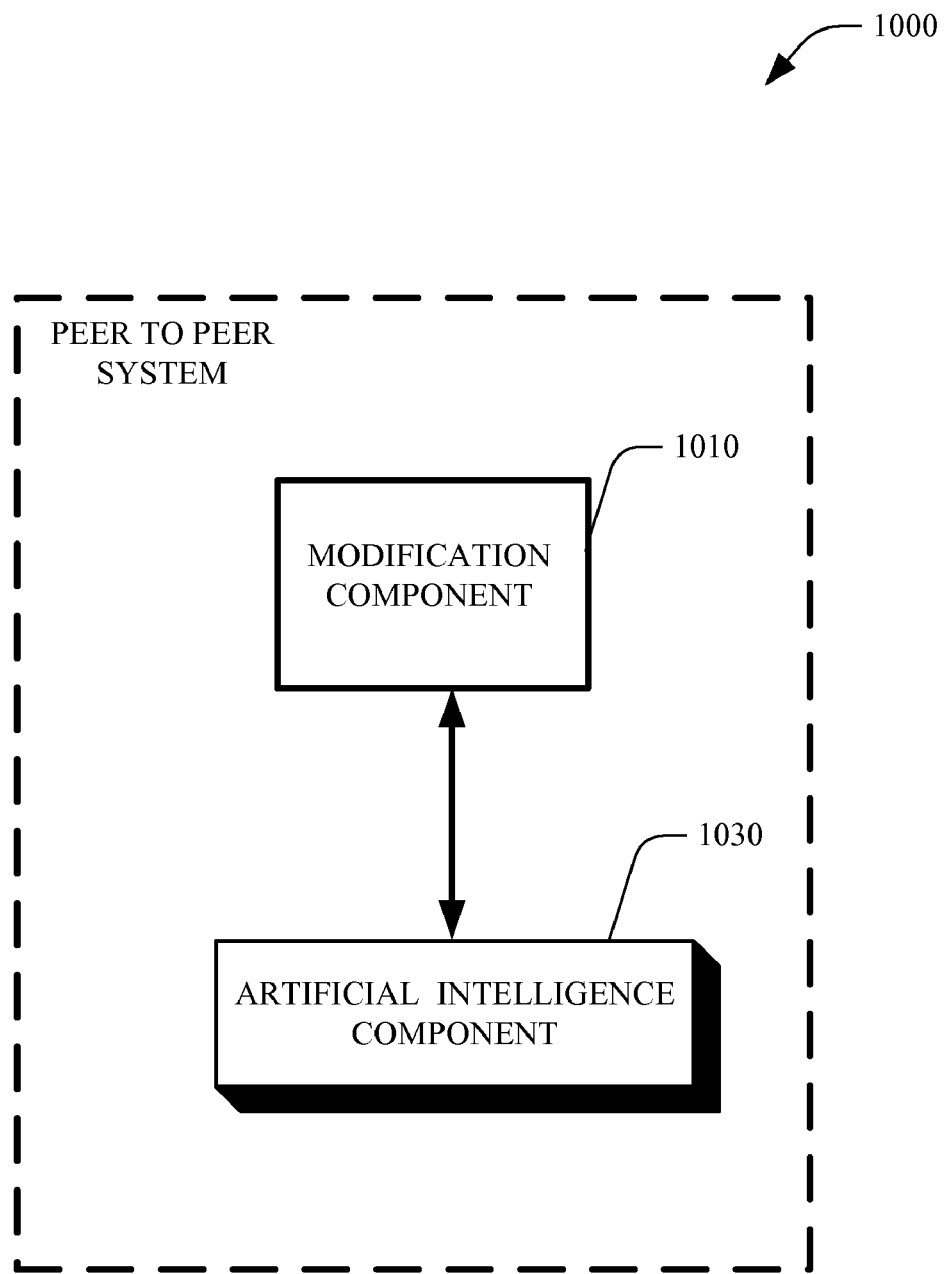
FIG. 10 illustrates an artificial intelligence component that interacts with a modification component according to an aspect of the subject innovation.

FIG. 10 illustrates a peer to peer system 1000 that employs an artificial intelligence component 1030, which interacts with the modification component of the subject innovation. Such artificial intelligence (AI) component 1030 can be employed to facilitate inferring and/or determining when, where, and how to dynamically modify codes on the fly when a code is to be changed in the peer to peer system. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several events and data sources.

The AI component 1030 can employ any of a variety of suitable AI-based schemes as described supra in connection with facilitating various aspects of the herein described invention. For example, a process for learning explicitly or implicitly how a code or stored procedure is to be trusted can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior and/or receiving extrinsic information) so that the classifier is used to automatically determine according to a predetermined criteria which return an answer to a question. For example, with respect to SVM's that are well understood, SVM's are configured via a learning or training phase within a classifier constructor and feature selection module. A classifier is a function that maps an input attribute vector, $x = (x1, x2, x3, x4, xn)$, to a confidence that the input belongs to a class—that is, $f(x)$=confidence(class).

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

As used in this application, the terms "component" and "system", are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips. . . ), optical disks (e.g., compact disk (CD), digital versatile disk (DVD). . . ), smart cards, and flash memory devices (e.g., card, stick, key drive. . . ). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 11:
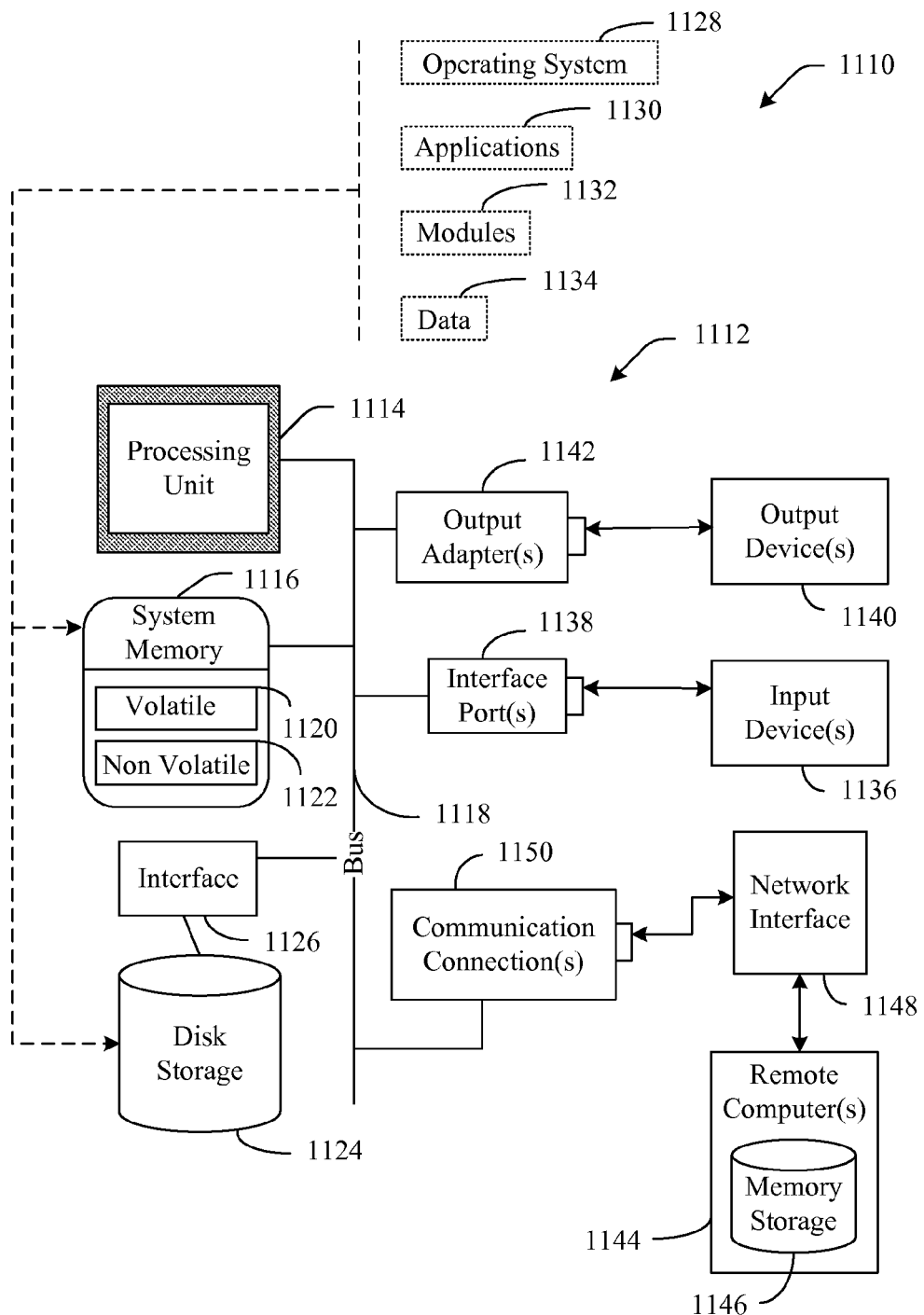
FIG. 11 illustrates an exemplary environment for implementing various aspects of the subject innovation.
Figure 12:
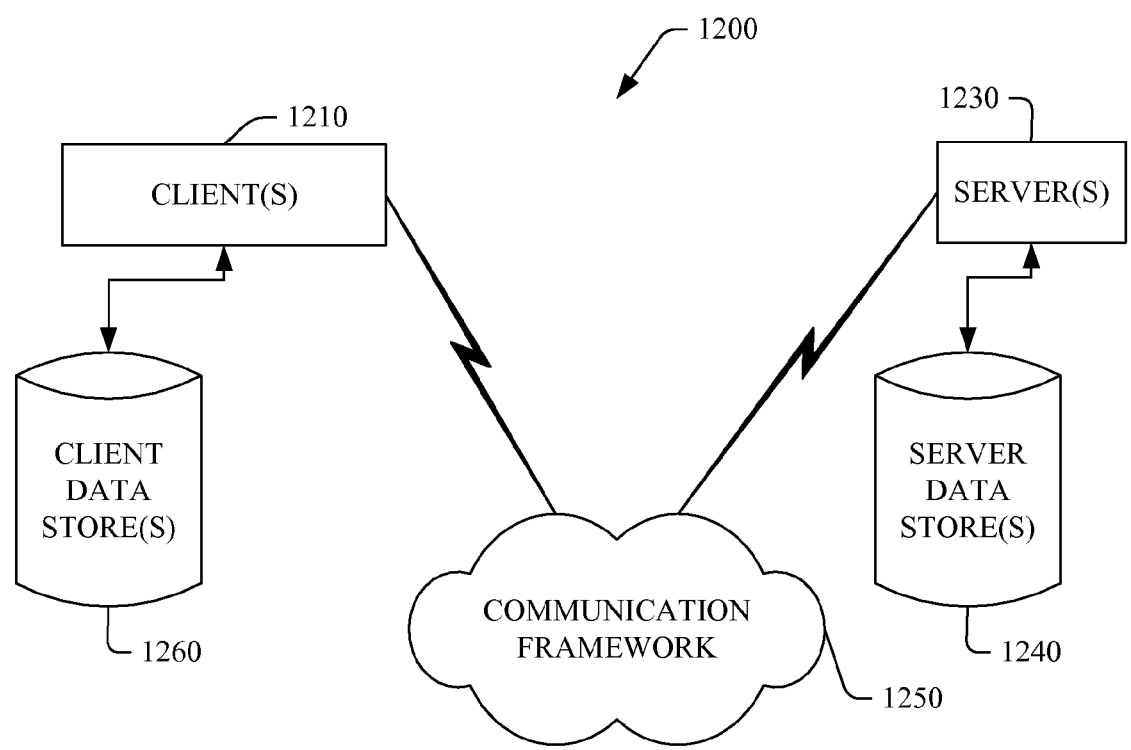
FIG. 12 is a schematic block diagram of a sample computing environment that can be employed for data retrieval according to an aspect of the subject innovation.

In order to provide a context for the various aspects of the disclosed subject matter, FIGS. 11 and 12 as well as the following discussion are intended to provide a brief, general description of a suitable environment in which the various aspects of the disclosed subject matter may be implemented.

While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 11, an exemplary environment 1110 for implementing various aspects of the subject innovation is described that includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates a disk storage 1124, wherein such disk storage 1124 includes, but is not limited to, devices like a magnetic disk drive, floppy disk drive, tape drive, Jaz drive, Zip drive, LS-60 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that various components described herein can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB) port. Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 12 is a schematic block diagram of a sample-computing environment 1200 that can be employed for implementing data retrieval, in accordance with an aspect of the subject innovation. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The servers 1230 can house threads to perform transformations by employing the components described herein, for example. One possible communication between a client 1210 and a server 1230 may be in the form of a data packet adapted to be transmitted between two or more computer processes. The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer program product for identifying changes to a database schema in a peer-to-peer environment and modifying database procedures to remain consistent with the changed schema, the computer program product comprising one or more computer readable storage media having encoded thereon computer executable instructions which, when executed upon one or more computer processors, perform the following:
identifying changes to a database schema, the changes occurring on at least one node of a plurality of nodes comprising the database;
a first node of the plurality of nodes broadcasting a request to a plurality of peer nodes to change stored procedures which depend upon the previous unchanged database schema for proper operation;
identifying one or more procedures which depend upon the previous unchanged database schema for proper operation, each of the one or more stored procedures being stored upon one or more of the plurality of nodes;
modifying each of the identified one or more procedures to remove the dependency upon the previous database schema so that the changed one or more procedures are consistent with and will properly operate with the changed database schema.

2. The computer program product of claim 1 further comprising identifying dependencies between the plurality of nodes, the dependencies being identifying by a modification component.

3. The computer program product of claim 1, the changes to a database schema comprising dropping of columns from a database.

4. The computer program product of claim 2, the dependencies being refreshed by the modification component.

5. The computer program product of claim 1 further comprising using a bulletin board to maintain a list of files exchanged between the plurality of nodes.

6. The computer program product of claim 5 further comprising an access layer tracking operation criteria for the plurality of nodes.

7. The computer program product of claim 5 further comprising a host computer facilitating operation of the access layer.

8. The computer program product of claim 1 further comprising an artificial intelligence component that facilitates modification of the change on-the-fly.

9. A computer implemented method for modifying stored procedures which are affected by changes to a database schema in a database distributed in a peer-to-peer environment comprising a plurality of nodes, the method comprising:
identifying one or more columns that are to be dropped from a table in a database;
identifying one or more stored procedures that have dependencies on the one or more columns being dropped from the table;
a first node of the plurality of nodes broadcasting a request to a plurality of peer nodes to change the one or more stored procedures; and
modifying the one or more stored procedures to remove the dependencies upon the one or more columns without halting an execution thereof, so that the one or more stored procedures are made consistent with the table with the one or more columns dropped.

10. The computer implemented method of claim 9 further comprising propagating the dependencies throughout the plurality of nodes associated with the database.

11. The computer implemented method of claim 9 further comprising detecting a request to drop the one or more columns.

12. The computer implemented method of claim 11 further comprising writing modifications of stored procedures or a code to a transactional language of the database.

13. The computer implemented method of claim 12 further comprising supplying changes to the stored procedures on-the-fly.

14. The computer implemented method of claim 9 further comprising refreshing the stored procedures.

15. The computer implemented method of claim 9 further comprising referring to non-dropped columns.

16. The computer implemented method of claim 9 further comprising re-generating the stored procedures.

17. The computer implemented method of claim 9 further comprising conflict detection between nodes.

18. The computer implemented method of claim 9 further comprising inferring modification of codes via classifiers.

* * * * *